United States Patent
Jarvis

(10) Patent No.: US 6,398,450 B1
(45) Date of Patent: Jun. 4, 2002

(54) FASTENER ARRANGEMENTS

(75) Inventor: Paul E Jarvis, Preston (GB)

(73) Assignee: British Aerospace Public Limited Company, Hants (GB)

( * ) Notice: Subject to any disclaimer, the term of this patent is extended or adjusted under 35 U.S.C. 154(b) by 0 days.

(21) Appl. No.: 09/381,268

(22) PCT Filed: Aug. 19, 1999

(86) PCT No.: PCT/GB99/02759

§ 371 (c)(1),
(2), (4) Date: Sep. 20, 1999

(87) PCT Pub. No.: WO00/11351

PCT Pub. Date: Mar. 2, 2000

(30) Foreign Application Priority Data

Aug. 20, 1998 (GB) ............................................. 9818052

(51) Int. Cl.$^7$ ................................................. F16B 21/00
(52) U.S. Cl. .................... 403/329; 403/28; 403/289; 403/404; 411/361; 29/447; 29/525.05; 29/525.13
(58) Field of Search .......................... 403/28, 289, 290, 403/404, 329, 279, 281; 411/361; 29/447, 525.05, 525.13; 148/573

(56) References Cited

U.S. PATENT DOCUMENTS

| | | | |
|---|---|---|---|
| 2,355,580 A | * | 8/1944 | Wing .......................... 411/361 |
| 2,395,667 A | * | 2/1946 | Keller et al. ................. 411/361 |
| 2,510,076 A | * | 6/1950 | Cockrell ...................... 411/361 |
| 4,198,895 A | * | 4/1980 | Ruhl ........................... 411/361 |
| 4,687,395 A | * | 8/1987 | Berecz et al. ................ 411/361 |
| 4,687,397 A | * | 8/1987 | Berecz ........................ 411/361 |
| 4,813,807 A | | 3/1989 | Mead |
| 5,120,175 A | | 6/1992 | Arbegast et al. |
| 5,265,456 A | * | 11/1993 | Kennedy et al. ............... 29/477 |

FOREIGN PATENT DOCUMENTS

EP 131 997 1/1985

OTHER PUBLICATIONS

Patent Abstracts of Japan vol. 018, No. 491 (M–1672) Sep. 13, 1994 & JP 06 159331 A (Hitachi Ltd) Jun. 7, 1994.

* cited by examiner

*Primary Examiner*—Lynne H. Browne
*Assistant Examiner*—Aaron Dunwoody
(74) *Attorney, Agent, or Firm*—Pillsbury Winthrop LLP

(57) ABSTRACT

A fastening arrangement (14) comprises a shank (16) with a head (18) retained in a first component (10). The other end (25) of the shank is tapered or of other non-constant cross section and terminates in a domed portion (26). A second part of the fastening arrangement includes a collar (34) of shape memory metal material, which may be swaged to engage and retain the domed portion (26) by a magnetized pressure ring (36), which is applied by applying a strong magnetic field. To release the fastening, the pressure ring is released by the application of a magnetic field and the collar (34) is then heated so that it reverts to an open position.

15 Claims, 2 Drawing Sheets

FASTENER ARRANGEMENTS

RELATED APPLICATION

This application is the national phase of international application PCT/GB99/02759 filed Aug. 19, 1999 which designated the U.S.

BACKGROUND OF THE INVENTION

This invention relates to fastening arrangements, fastening methods, tools for use with said fastenings, and associated fastening kits.

1. Field of the Invention

There are many situations where it is required to connect together two items either permanently or semi-permanently and where there is access to one side only of the assembly. Examples include the attachment of panels or plates to underlying frames or supports in structures such as aircraft, ships, cars, etc. Arrangements such as captive bolts, blind rivets, rivet nuts etc., may be used in such applications. There are however disadvantages with such arrangements. For example, with rivets and captive nuts, the surface of the panel is interrupted by the head of the rivet or bolt. This interruption increases aerodynamic drag and, if the panel itself otherwise has a low radar signature, considerably increases the radar signature. In addition the exposed head of the rivet or bolt which is normally connected at its other end to a metal support structure, renders the head of the bolt or rivet susceptible to lightning strike.

2. Description of Related Art

Accordingly, there is a need for a fastener which overcomes at least some of the above disadvantages.

Thus, in one aspect, this invention provides a fastener arrangement for connecting together two members, said arrangement including:

a first component for association with a first of said members, and a second component for association with the second of said members, said second component including a retention element of shape memory material configurable between a closed state in which it engages first component to retain it, and an open state in which first component may be withdrawn from said second component, and a closure element adapted in use to co-operate with said retention element during fastening of said arrangement to deform said retention element from its open state to its closed state.

This arrangement therefore makes use of the recovery properties of a shape memory material to reconfigure between a closed state and an open state.

The provision of a closure element facilitates the application of an external force to deform or swage the shape memory retention element around the first component.

The first component preferably includes a head means for engaging said first member and a shank means comprising an engagement region for engaging said second component, said engagement region including a region of non-constant cross section including an abutment or shoulder region for co-operation with an associated abutment region on said retention element. In one arrangement, said region of non-constant cross section is tapered in the direction away from said head means. Many geometries are possible. In particular, it should be noted that, although in the preferred embodiment, the second component fits around the end of the first, it would be possible to have an arrangement in which the second component was deformed to fill a recess or bore within the first component.

Preferably, the retention element is made of a heat recoverable shape memory metal alloy. The retention element is preferably formed such that, when in said closed state, on heating to a temperature equal to or greater than a predetermined recovery temperature, the retention element tends to recover to said open state (assuming that the retention element is otherwise unencumbered).

To allow said retention element to be heated by the application of a coil or tool remote therefrom, the retention element is preferably made of an inductive metal material, whereby said tension element may be heated by the application of an electric field.

It will be appreciated that, in the preferred embodiment, the closure element needs to be moved into and out of engagement with the retention element to open and close it. A reasonable amount of force may need to be provided and this ideally is provided without direct mechanical application. Thus the closure element is preferably formed of a ferro-electric material whereby it may be urged into or out of engagement with said retention element by the application of an external magnetic field.

In another aspect, this invention provides a blind fastener arrangement for connecting together two members, said arrangement comprising:

a first component for connection to a first of said members, a second component for being received in or associated with a blind recess of the other of said members, said second component configurable between a closed state in which said first component is retained against separation from said second component and an open state in which said first component may be withdrawn from said second component, wherein said second component is adapted to be changed between said open and closed states by the application of an electric and/or magnetic field.

Whilst the fastening arrangement defined above may be used in a wide range of different applications, it has been designed with particular reference to use for securing a first member in the form of a panel or skin element to an underlying member or structure. More particularly, the fastening arrangement may find particular application for use in connecting a panel or plate element to an underlying frame or structure. Preferably, the surface of the first member remote from said second member is substantially smooth and continuous and uninterrupted by said first component.

In another aspect there is provided a method of connecting together two members, which method comprises providing a fastening arrangement comprising a first component for association with a first of said members and a second component for association with the second of said members, said second component including a retention element of shape memory material configurable between a closed state in which engages said first component to retain it and an open state in which said first component may be withdrawn therefrom, the method comprising bringing together said two members, assembling said first component and said second component with the retention element initially in an open state, and urging a closure element against said retention element to change it to its closed state, thereby connecting said members.

BRIEF SUMMARY OF THE INVENTION

Preferably the retention element is moved to its closed state by means of a closure element. Preferably, the closure element is moved between the fastened or relaxed states by means of an electrical and/or magnetic field. For release of the fastening, the retention element is preferably heated to a temperature equal to or greater than its recovery temperature. Heating may conveniently be by means of a high frequency electromagnetic field, or an electrical current.

In another aspect, this invention provides a tool for applying or releasing a fastening arrangement as defined above, including:

magnetization means for producing a magnetic field of a given polarity for urging said closure element in a direction tending to cause said retention element to change from its open state to its closed state, magnetisation means for producing a magnetic field of a given polarity for urging said closure element in a direction out of co-operation with said retention element, and, means for inductively and/or electrically heating said retention element.

Whilst the invention has been described above, it extends to any inventive combination of the features set out above or in the following description.

The invention may be performed in various ways, and, by way of example only, an embodiment thereof will now be described in detail, reference being made to the accompanying drawings which:

The fastening arrangement described and illustrated below is intended for use for attaching a panel to a substrate in an aircraft having a low radar signature.

Thus, when assembled, no part of the fastening arrangement is visible externally. This is beneficial in terms of stealth requirements, aerodynamic drag and improved resistance to lightening strike.

Figure 1:
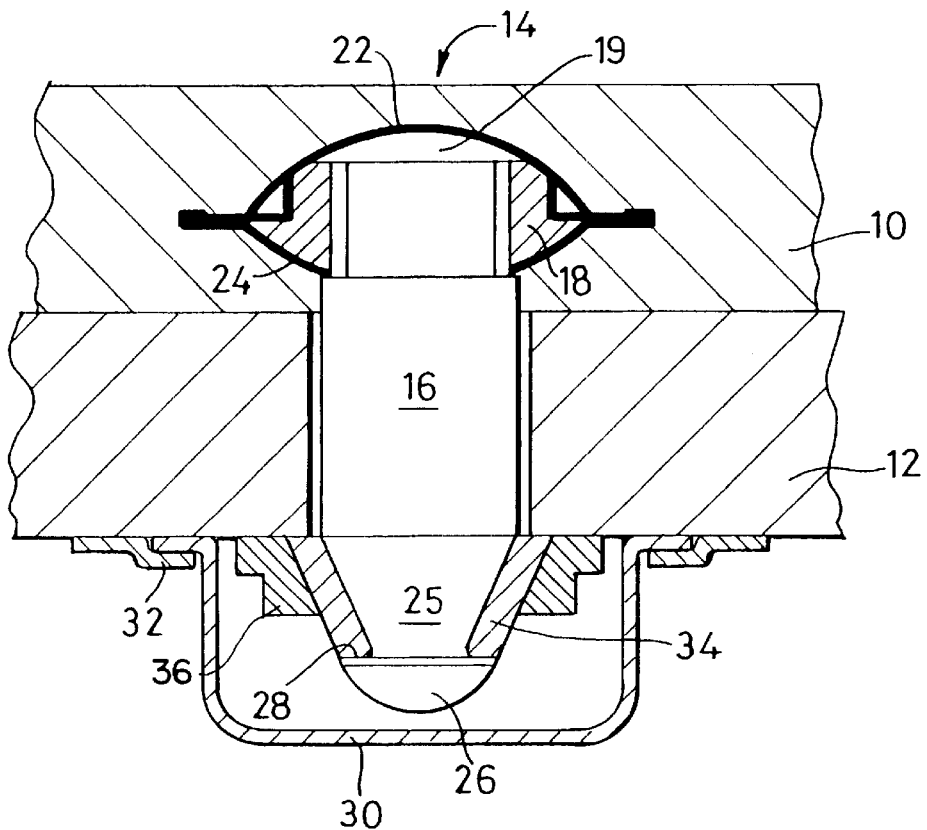
FIG. 1 is a vertical section view through an embodiment of fastener in accordance with this invention, in a fastened condition.
Figure 2:
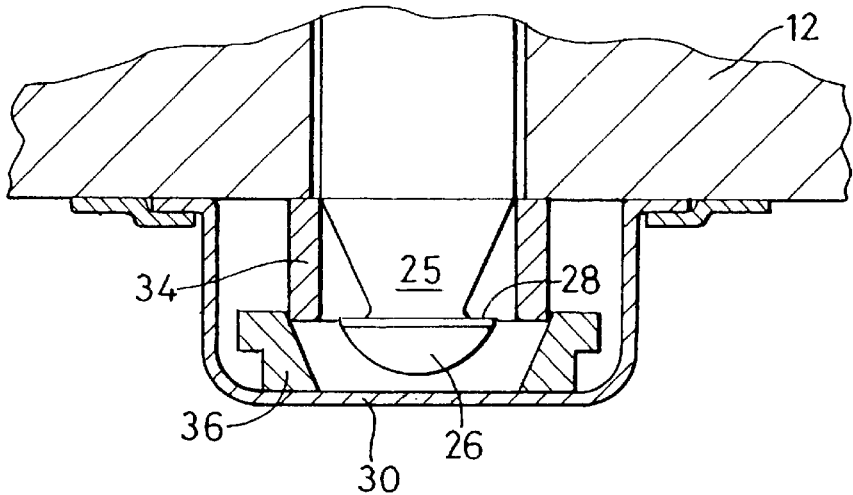
FIG. 2 is a detail view on the lower end of the fastening arrangement of FIG. 1 showing the fastening in a released condition.
Figure 3:
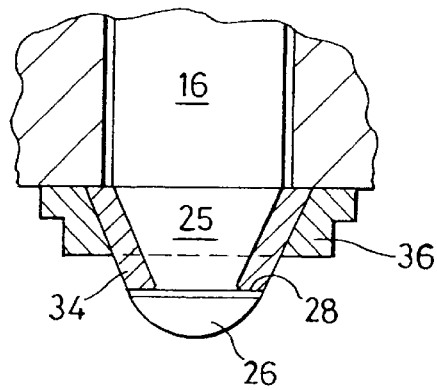
FIG. 3 is a view on the lower part of a fastening of the arrangement of FIG. 1 in the fastened condition.

Referring now to FIGS. 1 to 3 of the drawings, the panel 10 or first component is shown connected to a lower substrate or second component 12 by means of the fastening arrangement shown generally at 14. The fastening arrangement 14 comprises a shank 16 which in this arrangement is threaded at its upper end and screwed into a head 18; other mechanical connecting systems may be employed. The head 18 is received in a pocket 19 formed in the panel 10 by moulding in situ. Within the pocket 19 in this particular arrangement is a domed cap 22 and a hemispherical liner 24 which provide sufficient clearance for the head 18 to be capable of slight angular movement for a alignment purposes. The domed cap includes an anti-rotation device (not shown) for preventing rotation of the nut 18. The lower end 25 of the shank 16 is tapered, diminishing in cross section towards its free end and terminating in an enlarged domed portion 26 which provides an annular lip or recess 28. A top hat cap section 30 is secured to the lower surface of the substrate 12 by means of a retaining ring 32. The lower end 25 of the shank may take more complex shapes as required.

In FIG. 2, the second part of the fastening comprises a shape memory metal collar 34 of inner diameter similar to that of the widest portion of the tapered part of the shank 16, of outer diameter substantially greater than that of the bore in the second component 12 and of axial length approximately the same as that of the tapered portion. The collar 34 is made of shape memory metal alloy; such materials have the property that, after initial machining or forming, the material may be plastically deformed into various shapes but, if heated to a temperature equal to or in excess of its recovery temperature, the article will exhibit a "memory" phenomenon whereby it tends to return to the shape as initially machined or formed. The second part also includes a ferro-magnetic pressure ring 36 having a conical inner profile.

Figure 4:
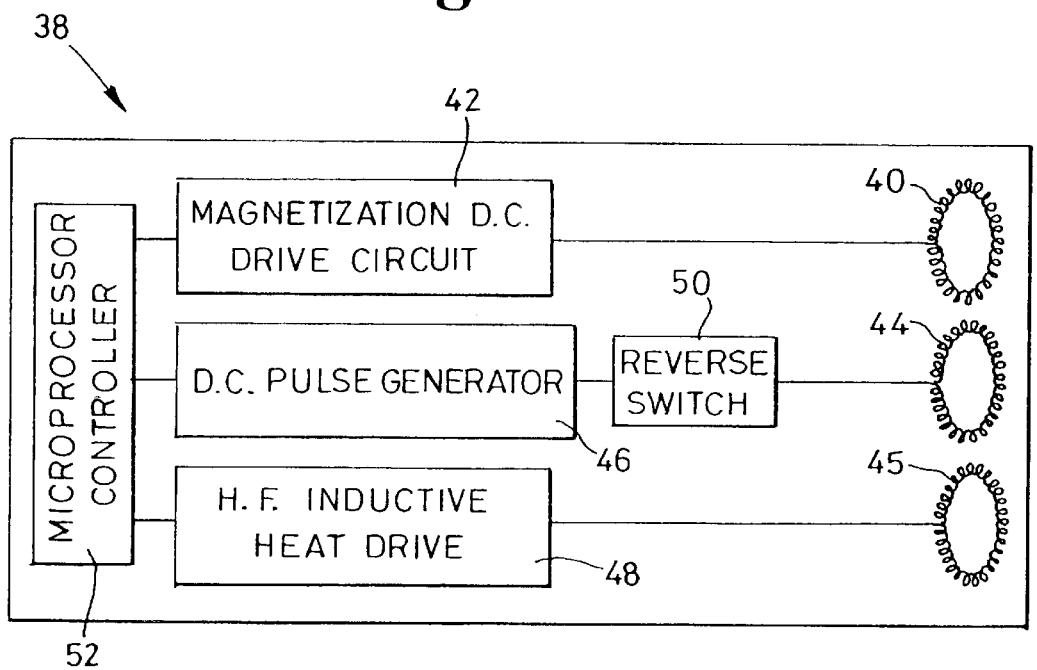
FIG. 4 is a schematic block diagram of a tool for fastening or releasing the fastening of FIGS. 1 to 3.

In operation, the panel 10 and the substrate 12 are prepared for fixing by providing the pocket 19 in the panel 10 and assembling the collar 34, the pressure ring 36 and the top hat cover 30 on the lower side of the substrate using the retaining ring 32. The shank 16 is then screwed into the head 18 and then passed through a suitably formed bore in the substrate 12 to assume the position shown in FIG. 2. Thereafter a special tool 38 as illustrated schematically in FIG. 4 is brought next to the fastening arrangement 14 adjacent the exposed surface of the panel 10. The tool has a low-power magnetic coil 40 energised by a DC drive circuit 42. A high power magnetic coil 44 is also provided and may be energised by a DC pulse generator 46. A high frequency inductive heat drive 48 is connected to a high frequency coil 45. The DC pulse generator 46 includes an electrical energy storage device such as a capacitor and/or an inductor for generating a very high intensity pulse of short duration, and a changeover switch 50 is provided so that the polarity of the pulse may be selected prior to input to the coil 44. The DC drive circuit 42, DC pulse generator 46 and the high frequency inductive heat drive 48 are controlled by a microprocessor controller 52.

With the components in the position as shown in FIG. 2, the tool 38 is manoeuvred adjacent the fastening arrangement 14 so that the low power coil 40 is generally co-axial with the shank 16, and the low power coil is energised to magnetise the pressure ring 36. Immediately thereafter the coil 44 is aligned with the arrangement 14 and a DC pulse is generated by the pulse generator 46 and supplied to the coil 44 in the appropriate sense to force the pressure ring 36 on to the collar, which pushes the collar 34 into contact with the lower substrate 12 and provides the initial clamp-up force on the joint. The pressure ring continues to move over the collar 34 with the interior conical surface thereof swaging the collar material into the retaining lips or shoulder 28 behind the domed end 26 of the lower portion of the shank 16, until the arrangement adopts the configuration shown in FIGS. 1 and 3 with the collar 34 locked at the shank 16 and providing fastener closure. Elastic relaxation of the collar 34, combined with its precise geometric form, retains the pressure ring 36.

To remove the fastener, the collar 34 needs to be expanded in diameter back to its pre-installed size to allow its removal from the shank 16. To do this, the tool 38 is brought back into the vicinity of the fastener and the low power coil 40 aligned with the arrangement 14 and used to magnetize the pressure ring 36. Thereafter the high power coil 44 is aligned with the arrangement 14 and a high energy DC pulse is applied via the generator 46 and high power coil 44 in the appropriate sense to force the magnetized pressure ring 36 off the collar 34, this item being captured by the top hat cap section 30. At this stage the retaining collar 34 is still swaged around the lower end of the shank. The high frequency inductive heat drive 48 is then energised to drive the high frequency coil 45 to heat the collar 34 of shape memory metal material to recover its original shape. The fastener and panel can then be removed.

To indicate the state of the fastener, i.e. open or closed, a dot or patch of magnetically activated colour change material is applied on the external surface of the panel 10, over the top of the fastener. This allows the hidden fastener to be located and also indicates its precise state. The magnetic colour change material responds to the proximity or otherwise of the magnetised pressure ring 36 and changes colour dependent on whether the pressure ring 36 is in the open position of FIG. 2 or the closed position of FIG. 3.

What is claimed is:

1. A fastener arrangement for connecting together two members, said arrangement including:

a first component for association with a first of said members, and a second component for association with the second of said members, said second component including a retention element of shape memory material configurable between a closed state in which it engages first component to retain it, and an open state in which first component may be withdrawn from said second component, and a closure element adapted in use to co-operate with said retention element during fastening of said arrangement to deform said retention element from its open state to its closed state, wherein said retention element is formed such that, when in said closed state, on heating thereof to a temperature to equal or greater than a predetermined recovery temperature, said retention element tends to recover towards said open state.

2. A fastener arrangement according to claim 1, wherein said second component includes head means for engaging said first member and a shank means comprising an engagement region for engaging said second component, said engagement region including a region of non-constant cross-section including an abutment or shoulder region for co-operation with an associated abutment region on said retention element.

3. A fastener arrangement according to claim 1, wherein said retention element is made of a metal alloy material.

4. A fastener arrangement according to claim 1, wherein said retention element is made of an inductive material, whereby said retention element may be heated by the application of a high frequency electromagnetic field.

5. A fastener arrangement according to claim 1, wherein said closure element is formed of a ferroelectric material, whereby said closure element may be urged into or out of engagement with said retention element by the direct application of a magnetic field.

6. A fastener arrangement according to claim 1, wherein said first component comprises a panel or skin element.

7. A fastener arrangement according to claim 1 wherein the surface of the first member remote from said second member is substantially smooth and continuous and uninterrupted by said first component.

8. A fastener arrangement according to claim 1, wherein said closure element is constructed and arranged to remain in engagement with said retention element when the retention element is in its closed state.

9. A fastener arrangement for connecting together two members, said arrangement comprising:

a first component for connection to a first of said members and, a second component for being received in or associated with a blind recess of the other of said members, said second component being configurable between a closed state in which said first component is retained against separation from said second component and an open state in which said first component may be withdrawn from said second component, wherein said second component is adapted to be changed between said open and closed states by the application of at least one of an electric field and a magnetic field.

10. A method of connecting together two members, which method comprises:

providing a fastening arrangement which includes a first component for association with a first of said members and a second component for association with a second of said members, said second component including a retention element of shape memory material configurable between a closed state in which it engages said first component to retain it, and an open state in which said first component may be withdrawn therefrom, and a closure element, wherein said retention element is formed such that, when in said closed state, on heating thereof to a temperature equal to or greater than a predetermined recovery temperature, said retention element tends to recover towards said open state, the method comprising:
        bringing together said two members,
        assembling said first component and said second component with the retention element initially in an open state, and
        urging said closure element against said retention element to change it to said closed state, thereby connecting said members.

11. A method according to claim 10, which includes applying at least one of an electric field and a magnetic field in the proximity of said fastening arrangement to cause said closure element to deform said retention element.

12. A method according to either of claims 10 or 11 which method is followed by releasing the two connected members by releasing said closure element by the application of at least one of an electric field and a magnetic field.

13. A method according to claim 12 which further includes heating said retention element by at least one of an electric field and a magnetic field to cause it to return to an open state.

14. A method according to claim 10, wherein, said closure element having been urged against said retention element to change it to its closed state, said method includes retaining said closure element in engagement with said retention element.

15. A method of releasing two members connected by a fastening arrangement which includes a first component associated with a first of said members and a second component associated with the second of said members, said second component including a retention element of shape memory material in a closed state in which it engages said first component to retain it, and a closure element in contact with said retention element, which method comprises:

releasing said closure element by the application of at least one of an electric field and a magnetic field.

* * * * *